United States Patent Office 2,716,532
Patented Aug. 30, 1955

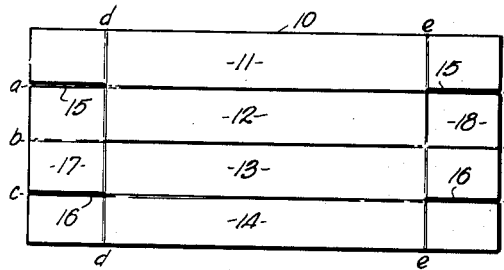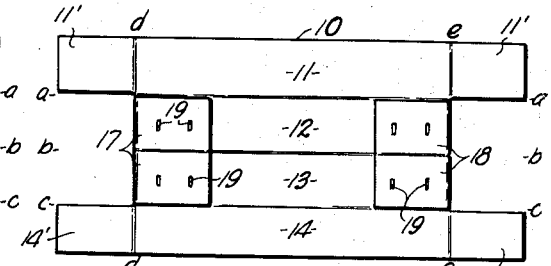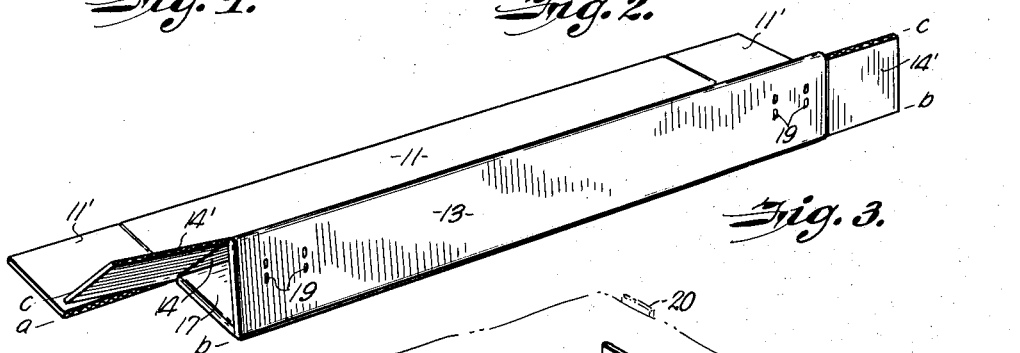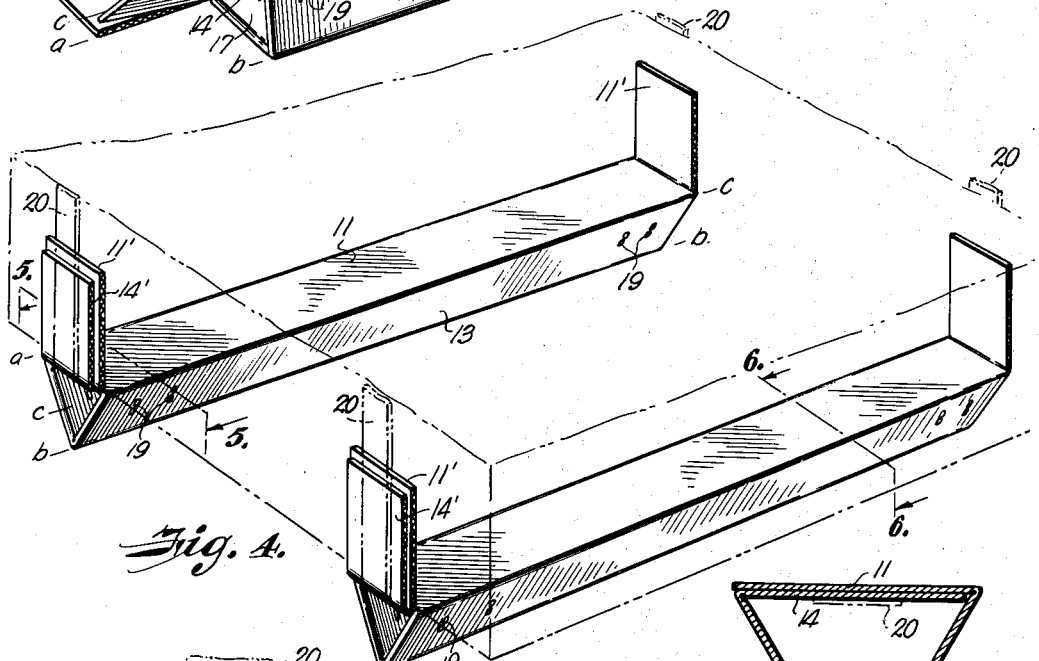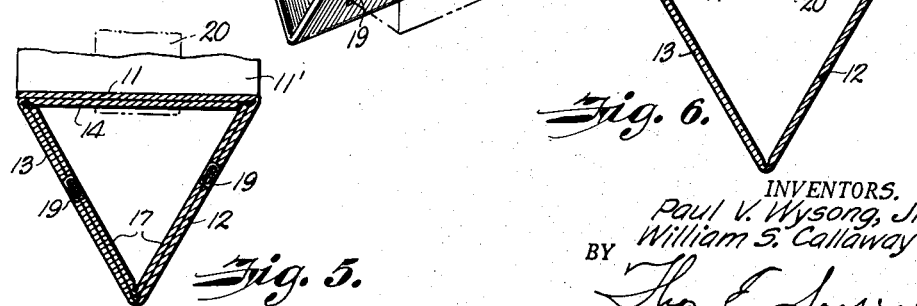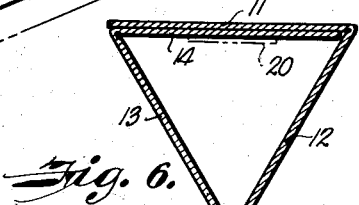
INVENTORS.
Paul V. Wysong, Jr.
William S. Callaway
BY
ATTORNEY.

2,716,532

DISPOSABLE SKIDS

Paul V. Wysong, Jr., Kansas City, Kans., and William S. Callaway, Kansas City, Mo., assignors to Gustin-Bacon Manufacturing Company, a corporation of Missouri Application January 21, 1950, Serial No. 139,844

2 Claims. (Cl. 248—120)

The present invention relates in general to protecting bundles, bales and analogous units from injury, and it deals more particularly with an improved skid or batten strip for supporting such units.

Many products, such as cotton, wool, paper, fibrous mat, etc., are bundled or baled for convenience in handling, and, because the bundles are subject to injury in the course of handling, it often is the practice to store them and transport them from place to place on pallets or raised platforms provided with skids.

It is an object of the invention broadly speaking, to provide a new form of skid which is economical to manufacture, convenient to use and highly efficient in protecting bundles, bales or similar units from damage.

Another object is to obviate the labor and attendant difficulty of shifting a given bale or the like onto and off of a succession of pallets at various stages in its handling, as well as to eliminate the need for keeping a permanent supply of pallets at each handling station and shifting them about in unloaded as well as loaded condition incident to the work carried out there.

With the foregoing ends in view, it is another object of the invention to provide expendable skids which may be attached more or less permanently to each bale or similar unit to carry the same wherever it goes, the skids being sufficiently sturdy to last as long as the associated bale needs their protection, but being sufficiently inexpensive to permit discarding them, after they have served their purpose in connection with a single bale.

Since the handling of baled goods or the like ordinarily involves shifting the package about the floor of the factory or plant where it originates, followed by shipment in the hands of one or more private carriers and one or more common carriers (often to a distant city), followed by shifting about the floor of the destination warehouse and plant before the bale finally is broken down, the saving in labor effected by providing permanent skids as a part of the bale will be self-evident; however, it also will be plain that the skids must be durable without being expensive or difficult to manufacture, since the feasibility of the arrangement hinges on being able to justify, on a commercial basis, discarding the skids when the bale, as such, has been handled for the last time.

A feature of the invention resides in the provision of skids or batten strips satisfying these requirements. Another feature lies in constructional details of our skid or batten strip whereby it gives more than ordinary protection to the attached bundle, bale or similar unit, preventing in the case of a bale, for example, the damage which otherwise would occur from the straps, wires or other bale fastening means cutting into the bale.

Other objects and features of the invention will appear in the course of the following description.

In the accompanying drawings which form a part of the specification and are to be read in conjunction therewith, and in which like reference numerals are employed to identify like parts of the various views, Fig. 1 is a plan view or pattern of a flat blank of sheet material showing the manner in which it is cut and scored preparatory to being folded to form a skid according to the invention, Fig. 2 is a similar view of the blank showing the manner in which it is folded as the first step in forming the skid, Fig. 3 is a perspective view illustrating a subsequent folding step, Fig. 4 is a perspective view showing a pair of the skids in final form, and illustrating the manner in which they are affixed to the article to be carried, Fig. 5 is a cross sectional view taken along the line 5—5 of Fig. 4 in the direction of the arrows, and Fig. 6 is a cross sectional view taken along the line 6—6 of Fig. 4 in the direction of the arrows.

Referring more particularly to Fig. 1, the numeral 10 designates a rectangular blank of flat sheet-like material such as corrugated paper board, fiber board, or plastic impregnated paper or cloth, for example. Fold lines a—a, b—b, and c—c, divide the blank longitudinally into four equal areas, 11, 12, 13 and 14; fold lines d—d and e—e, set inwardly from the ends of the blank, extend crosswise thereof intersecting the longitudinal foldlines. Along the line a—a the blank contains a pair of slits 15 extending inwardly from the end to the transverse fold lines as shown. A similar pair of slits 16 extend inwardly from the ends of the blank along the line c—c. These four slits are the only ones in the blank, the remaining fold lines simply being scored.

In forming the skid, the left and right hand end areas 17 and 18 between the aforementioned slits first are folded inwardly as shown in Fig. 2 and secured to the central panels 12 and 13 by means of staples 19 or by stitching, gluing or otherwise. Next, the lower longitudinal edge of the blank is brought upwardly and over so that it lies along the line a—a, the blank being folded along lines b—b and c—c; the position of parts now is as shown in Fig. 3. With the parts in this position, section 11 now is folded upwardly along the line a—a so that its face is flat against the face of section 14 (see Fig. 6), the two faces being secured together by glue, stitching or other suitable means.

The finished skid thus is a rigid tube of triangular cross section, the tube being of double thickness of one side and on that side having outwardly projecting flaps or tabs 11' and 14' at each end of the tube. The length of the tube preferably corresponds to the horizontal thickness of the bale or other unit to be carried thereon so that the flaps, when bent upwardly as shown in Fig. 4 will lie against opposite faces of the supported unit. The skid is attached to the latter unit by passing a flexible strap or band 20 through the tube and around the remaining three sides of the unit, the ends of the strap being connected together in any convenient fashion, not shown. In the case of a bundle, bale or the like, this strap preferably is the same one utilized in keeping the contents of the package in bundled or baled form. In Fig. 4 only two skids are shown attached to the supported unit, but it will be self-evident that as many skids as necessary may be employed.

Skids of the character disclosed serve to protect the packaged unit from damage to which it otherwise would be subject due to abrasive contact with factory and warehouse floors, conveyors, the inside of box cars and trucks while in shipment, as well as from various other possible sources of injury. Moreover they serve to protect it across the face and around the corners from the cutting action of the steel strapping or other securing means which may be used. It should be noted that at the points where greatest protection is required (such as the portion in contact with the strapping) and at the ends of the skids where the greatest strength and durability is required, areas of double thickness are provided. Thus, without sacrificing protection and strength, it is possible to construct the skids of relatively cheap material such as corrugated paper board which may be discarded after use. Naturally, if it is desired that the skids have a longer life and be re-usable, a more durable material may be substituted.

Although the invention has been described with particular reference to bundled or baled products, it should be understood that this is intended merely to be exemplary of a typical use of the skids and that they may be used for the support and transportation of a wide variety of additional objects customarily handled on pallets or the like. Moreover, the invention contemplates the attachment of our triangular tubes not only to the bottom of the unit to be handled, but also as batten strips or buffers to the sides and/or top of the unit if similar protection of these faces is desired.

From the foregoing it will be seen that the invention is one well adapted to attain all of the ends and objects hereinbefore set forth together with other advantages which are obvious and which are inherent to the arrangement disclosed.

It will be understood that certain features and subcombinations are of utility and may be employed without reference to other features and subcombinations. This is contemplated by and is within the scope of the appended claims.

Inasmuch as various possible modifications of the invention may be made without departing from the scope thereof, it is to be understood that all matter herein set forth or shown in the accompanying drawings is to be interpreted as illustrative and not in a limiting sense.

Having thus described the invention, we claim:

1. A disposable tubular skid adapted to be secured across the bottom of an article to be carried by means of a flexible strap threaded through the tube and encircling the article comprising a rigid tube constructed of fiberboard and having a triangular cross section, said tube being open at both ends, one wall of said tube adapted to engage said article and being of double thickness throughout the length of the tube, and outwardly projecting double thickness flaps integral with the ends of said one wall and adapted to lie between the article and the straps.

2. A disposable tubular skid adapted to be secured across the bottom of an article to be carried by means of a flexible strap threaded through the tube and encircling the article comprising a rigid tube constructed of fiberboard and having a triangular cross section, said tube being open at both ends, one wall of said tube adapted to abut the bottom of said article and being of double thickness throughout the length of the tube and the remaining two walls being of double thickness only at the ends of the tube, and outwardly projecting double thickness flaps integral with the ends of said one wall and adapted to lie between the article and the straps.

References Cited in the file of this patent

UNITED STATES PATENTS

| Number | Name | Date |
|---|---|---|
| 1,605,901 | O'Neil | Nov. 2, 1926 |
| 1,758,585 | Riegel | May 13, 1930 |
| 2,303,631 | Grant | Dec. 1, 1942 |
| 2,318,655 | Zalkind | May 11, 1943 |
| 2,334,997 | Doll | Nov. 23, 1943 |
| 2,444,183 | Cahners | June 29, 1948 |
| 2,609,136 | Sider | Sept. 2, 1952 |
| 2,611,569 | Coleman et al. | Sept. 23, 1952 |
| 2,626,456 | Harrison | Jan. 27, 1953 |